(12) United States Patent
Cho et al.

(10) Patent No.: US 9,063,830 B2
(45) Date of Patent: Jun. 23, 2015

(54) MICRO-SD DEVICE LOADED WITH A SMART CARD

(71) Applicant: SK C&C Co., Ltd., Gyeonggi-do (KR)

(72) Inventors: Zang-Hee Cho, Gyeonggi-do (KR); Sang-Koo Yeo, Gyeonggi-do (KR); Dong-Su Park, Seoul (KR)

(73) Assignee: SK C&C Co., Ltd. (KR)

( * ) Notice: Subject to any disclaimer, the term of this patent is extended or adjusted under 35 U.S.C. 154(b) by 148 days.

(21) Appl. No.: 13/680,429

(22) Filed: Nov. 19, 2012

(65) Prior Publication Data

US 2013/0080702 A1 Mar. 28, 2013

(30) Foreign Application Priority Data

May 19, 2010 (KR) .......... 10-2010-0047056

(51) Int. Cl.
| | |
|---|---|
| *G06F 13/00* | (2006.01) |
| *G06F 13/28* | (2006.01) |
| *G06F 12/00* | (2006.01) |
| *G06K 19/07* | (2006.01) |
| *G06K 19/077* | (2006.01) |

(52) U.S. Cl.
CPC ............ *G06F 12/00* (2013.01); *G06K 19/0721* (2013.01); *G06K 19/07732* (2013.01); *G06K 19/07741* (2013.01)

(58) Field of Classification Search
CPC ................... G06K 19/07741; G06K 19/07732
See application file for complete search history.

(56) References Cited

U.S. PATENT DOCUMENTS

| | | | |
|---|---|---|---|
| 7,296,754 B2 | 11/2007 | Nishizawa et al. | |
| 7,669,773 B2 | 3/2010 | Nishizawa et al. | |
| 2005/0252978 A1 | 11/2005 | Nishizawa et al. | |
| 2007/0145152 A1* | 6/2007 | Jogand-Coulomb et al. | 235/492 |
| 2008/0257967 A1 | 10/2008 | Nishizawa et al. | |
| 2009/0166375 A1* | 7/2009 | Butler et al. | 221/282 |
| 2010/0181377 A1* | 7/2010 | Chen et al. | 235/440 |

FOREIGN PATENT DOCUMENTS

| | | | |
|---|---|---|---|
| EP | EP2023274 | * 11/2009 | ............ G06K 19/07 |
| JP | 2005-322109 | 11/2005 | |
| KR | 20-0347002 | 4/2004 | |
| KR | 10-0936252 | 1/2010 | |

OTHER PUBLICATIONS

LGM Card, LGM Card Mobile Payment, Sep. 2012, LogoMotion, pp. 1-2.*
International Search Report for PCT/KR2011/003476 mailed Oct. 31, 2011.
Written Opinion for PCT/KR2011/003476 mailed Oct. 31, 2011.

* cited by examiner

*Primary Examiner* — Eric S Cardwell
(74) *Attorney, Agent, or Firm* — Kevin L. Daffer; Daffer McDaniel LLP

(57) ABSTRACT

A Micro-Secure Digital ("SD") device loaded with a smart card that can be issued in bulk and in card form is provided. The device includes: a SD interface electrically connected to a host terminal; at least one memory module; a SD controller connected to the SD interface to provide communication between a host terminal and the memory module; at least one smart card IC for data communication with the SD controller; and a smart card interface for issuing smart cards. Since the Micro-SD device is provided with a smart card function and a card form satisfying the ISO 7810 standard, it may be issued in bulk through automation using a conventional automatic card-issuing device that automatically issues a credit card or a USIM card.

7 Claims, 2 Drawing Sheets

MICRO-SD DEVICE LOADED WITH A SMART CARD

CONTINUING DATA

This application is a continuation of pending International Application No. PCT/KR2011/003476 filed May 11, 2011, which designates the United States and claims priority to Korean Patent Application No. 10-2010-0047056 filed May 19, 2010.

BACKGROUND OF THE INVENTION

1. Field of the Invention

The present disclosure relates to a Micro-SD device which can be used as an external storage device, more particularly, a Micro-SD device loaded with a smart card including a smart card interface that can be issued in bulk and in a card type.

2. Description of the Relevant Art

In general, a Secure Digital ("SD") memory card is connected to a host terminal, for example, a portable global positioning system ("GPS") device, a moving picture experts group layer-3 audio ("MP3") player, a cellular phone, a digital camera, a notebook computer and a personal computer ("PC"), etc. and provides memory function to the host terminal through the SD interface. Particularly, a micro-memory card providing memory function to a cellular phone is called a Micro-SD card.

Recently, a SD memory card with smart card function has been developed. A smart card is equipped with an integrated circuit ("IC") chip having a microprocessor, an operating system, a security module, and a memory, etc. to provide storage, arithmetic and security function, etc. In this reason, it is less forgeable than a magnetic card, and it has an enlarged storage space and high security function, and it can be equipped with variety applications, so it is widely used in the field of finance, communication, education, administration, and transportation, etc.

Meanwhile, a SD memory card with smart card function requires an issuance process including initialization and input of user information. However, a traditional SD memory card with smart card function does not follow the International Organization for Standardization ("ISO") 7810 standard, so it cannot be issued by a universal card-issuing device which can automatically issue a plastic card such as a credit card, but is issued one by one manually which is inconvenient and decreases productivity. If it is issued in bulk in a card type or form, it takes just a few seconds, while by manual it takes several minutes. Further, because human mistakes can be included during the process, the manual issuance does not ensure accurate process.

SUMMARY OF THE INVENTION

An object of the present disclosure is to solve the above problem, to provide a Micro-SD device loaded with a smart card which includes a smart card interface, and for the Micro-SD device to be issued in bulk in a card type or form.

To achieve the above objects, a Micro-SD device loaded with a smart card includes: a SD interface electronically connected to a host terminal; at least one memory module; a SD controller connected to the SD interface to provide communication between the host terminal and the memory module; at least one smart card IC for data communication with the SD controller; and a smart card interface for issuing smart cards, and it is designed to be detachable from an empty card having a size and a form that satisfy the ISO 7810 standard of a plastic card so that it can be automatically issued by a universal card-issuing device.

In accordance with a preferred embodiment, the SD interface may be placed at an end of the body of the Micro-SD device and include eight or more SD pads which are compatible with Micro-SD standard. The smart card interface may include six ISO 7816 standard pads placed at the rear of the SD pads.

Further, the six ISO 7816 standard pads may include a power supply terminal, an initialization input terminal, a clock terminal, a grounding terminal, a program voltage terminal and a series data I/O terminal.

Furthermore, the smart card IC may be configured to be accessed through the smart card interface and/or the SD interface.

In accordance with a preferred embodiment, the body of the Micro-SD device may include a shoulder or a groove for removal from the host terminal.

Furthermore, the smart card interface may be configured to be connected to a communication line between the SD controller and the smart card IC, or directly to the SD controller or the smart card IC.

Since the Micro-SD device loaded with a smart card according to the present disclosure is realized not only to have smart card function but also in a card type to satisfy the ISO 7810 standard, it can be automatically issued in bulk using an universal automatic card-issuing device for a credit card or a USIM card. Accordingly, compared to a conventional SD memory card with smart card function issued by a manual device or a dedicated device, the Micro-SD device loaded with a smart card according to the present disclosure leads to the highly increased productivity.

DETAILED DESCRIPTION OF PREFERRED EMBODIMENTS

Hereinafter, preferred embodiments of the present disclosure are described in detail with reference to the accompanying drawings. For reference, in describing the embodiments, a detailed description of the known functions and constructions will be omitted if it is deemed to make the gist of the present disclosure unnecessarily vague.

Figure 1:
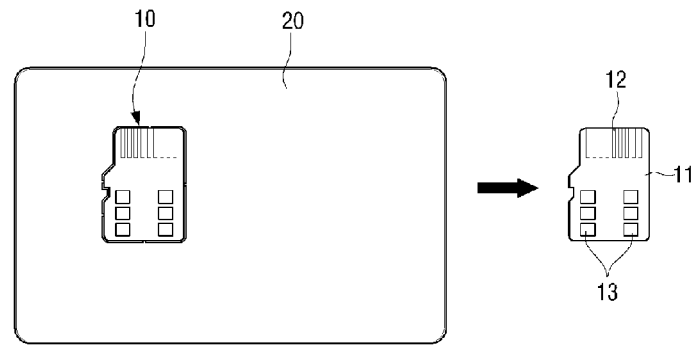
FIG. 1 is a schematic view of a Micro-SD device loaded with a smart card configured in a card type, and the state in which the device is separated from an empty card.

As shown in FIG. 1, a Micro-SD device 10 loaded with a smart card according to an embodiment is configured in a card type to be detachable from an empty card 20 having a proper size and a form that satisfy the ISO 7810 standard of a plastic card so that it is automatically issued by a universal card-issuing device in bulk. The empty card 20 has a punched cutting-line along the outer periphery of the Micro-SD device 10 for easy removal of it.

A conventional SD memory card with smart card function does not satisfy the ISO 7810 standard, so it cannot be issued using a universal automatic card-issuing device but issued in manual or using a dedicated and exclusive device which is inconvenient and decreases productivity. However, the Micro-SD device 10 loaded with a smart card according to the present disclosure is produced in a card form like an universal subscriber identity module (USIM) so that it can be automatically issued in bulk using an universal automatic card-issuing device for a credit card or a USIM card which leads to increase productivity.

Figure 2A:
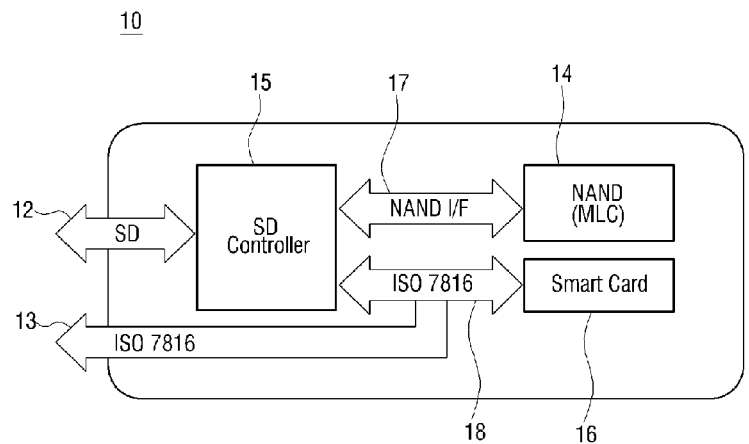
FIG. 2a is a block diagram to show the internal composition of a Micro-SD device loaded with a smart card.

As shown in FIG. 1 and FIG. 2a, the Micro-SD device 10 has a SD interface 12, which is electrically connected to a host terminal, at an end of the body 11 of the Micro-SD device. The SD interface 12 includes multiple pads, eight or more SD Pads which are compatible with Micro-SD standard. A smart card interface 13 is positioned in the rear of the SD interface 12. The SD interface 12 is used for data communication with the host terminal, and the smart card interface 13 is used for issuing a smart card.

The smart card interface 13 includes six or more ISO 7816 standard pads. The ISO 7816 standard pads may include a power supply terminal, an initialization input terminal, a clock terminal, a grounding terminal, a program voltage terminal and a serial data input/output (I/O) terminal. Although the figures illustrate an example of the arrangement of the SD interface 12 and the smart card interface 13 at the front and back of the Micro-SD device, the arrangement of the interfaces is not limited to the example and has a wide range of variation. For example, it is also possible to design the SD interface to include a typical USIM or an IC interface used in banking devices.

Furthermore, the body 11 of the Micro-SD device is equipped with at least one memory module 14, a SD controller 15 and at least one smart card IC 16. The memory module 14 and the SD controller 15 are connected through a not-and electronic logic gate interface (NAND I/F) 17 for communication, and the SD controller 15 and the smart card IC 16 are connected through an ISO 7816 communication line 18 for communication.

The Micro-SD device 10 loaded with a smart card 16 can be used at a PC or at a cellular phone through the SD interface 12 by conventional inserting methods. The smart card IC 16 can be accessed through the SD interface 12 connecting the SD controller 15 or the smart card interface 13. By means of that, the smart card IC 16 can be accessed through the simultaneous connection of the SD interface 12 and the smart card interface 13, or the selective connection between the SD interface 12 and the smart card interface 13.

FIG. 2a illustrates an embodiment of the smart card interface 13 connected to the ISO 7816 communication line 18, in which an access to the smart card IC 16 is possible through the SD controller 15 or the smart card interface 13.

Figure 2B:
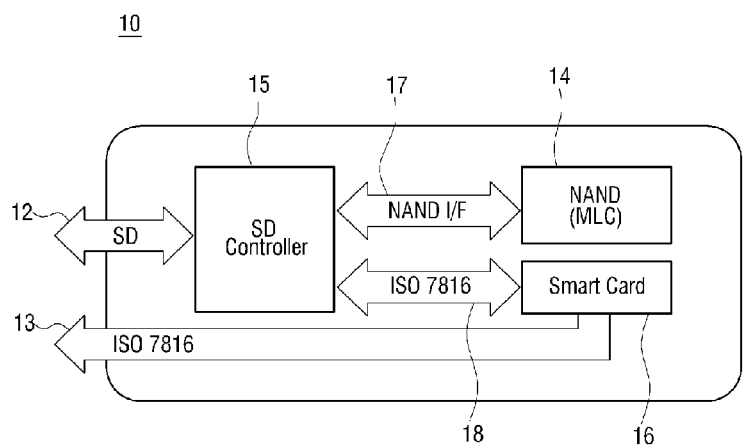
FIG. 2b is a block diagram to show the internal composition of a Micro-SD device loaded with a smart card according to another embodiment.

Alternatively, the smart card interface 13 may be directly connected to the smart card IC 16 as shown in FIG. 2b, or the smart card interface 13 may be directly connected to the SD controller 15, which is not shown.

When the memory module 14 receives a signal requesting to provide memory function from a host terminal through the SD interface 12 and the SD controller 15, it communicates the data related to memory function with the host terminal through the SD controller 15 and the SD interface 12. Various memory means may be applied for the memory module 14, and preferably a NAND type flash memory can be used which maintains records even during power off.

The SD controller 15 is connected to the SD interface 12, thereby communication between the host terminal and the memory module 14 can be performed through the SD interface 12. The SD controller 15 is connected to the pads of the SD interface 12 by physical lines respectively. Therefore the individual pad of the SD interface 12 is acting as a communication port for communicating between the host terminal and the memory module 14.

When the smart card IC 16 receives a signal requesting to provide memory function from the host terminal through the SD interface 12 and the SD controller 15, it communicates the data related to smart card function with the host terminal through the SD controller 15 and the SD interface 12.

Figure 4:
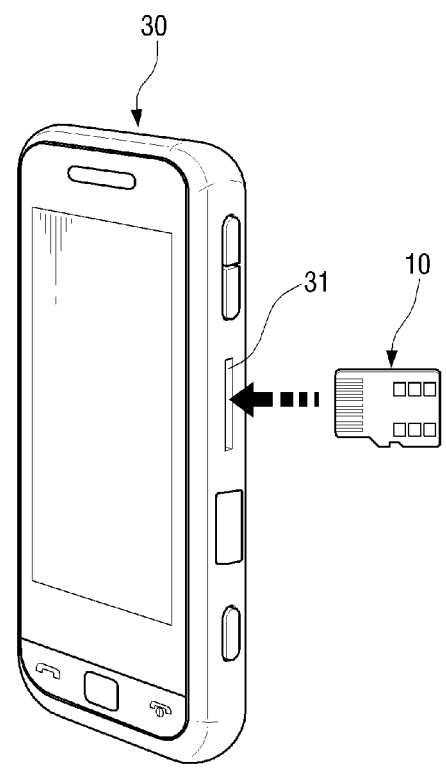
FIG. 4 is a schematic view of an example of applications on a cellular phone of a Micro-SD device loaded with a smart card.

As shown in FIG. 4, the Micro-SD device 10 loaded with a smart card is installed for use on a host terminal, for example a slot 31 of a cellular phone 30, and may be removed from the slot 31 during not used. However, the removal is not easy for the small sized Micro-SD device 10 inserted in the slot 31.

Figure 3A:
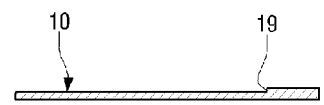
FIGS. 3a and 3b are cross-sections of different embodiments of the removal structure of a Micro-SD device loaded with a smart card.
Figure 3B:

Therefore, the Micro-SD device 10 loaded with a smart card includes a removal mechanism to facilitate the removal from the slot 31 of the host terminal. In one example shown in FIG. 3a, Micro-SD device 10 includes a shoulder 19 at an end as a removal mechanism. The depth of the shoulder 19 is determined within a range to satisfy the ISO 7810 standard. Alternatively, the removal mechanism may include a removal groove 19' at an end of the Micro-SD device 10 as shown FIG. 3b.

The security of the Micro-SD device 10 loaded with a smart card is guaranteed by a security authority module installed in the smart card IC 16. Accordingly, a controlled process of information encoding for a series of security and authority is implemented for an issuance of a smart card. By means of that, compared to a magnetic card, a smart card is issued in a particular place where a security module and an issuance system are installed.

A central server connected to the common network system of financial centers or banks, holding a master key which requires high level of security, supplies a security authority module to a card manufacturing company according to the order of a card issuing company such as a bank or a telecommunication company. Then, the card manufacturing company produces a smart card by card-manufacturing device using the security authority module, and supplies it to the card issuing company. Then, the card issuing company stores its corresponding characteristic keys on the smart card and supplies it to an end-user.

By inserting an empty card 20 equipped with a Micro-SD device 10 to an automatic card-manufacturing or card-issuing device, which is not shown, a smart card IC 16 is supplied with a security authority module. Then, by inputting corresponding characteristic keys of the card issuing company and user information, Micro-SD device loaded with a smart card having a high level of security can be automatically issued in bulk.

A Micro-SD device 10 issued by an automatic card-issuing device and supplied to an end-user together with an empty card can be separated from the empty card by cutting along a cutting-line, and the separated Micro-SD device can be installed on a slot of a host terminal such as a cellular phone.

The present disclosure has been described as exemplary manner. The terms used herein are only for a description and should not be interpreted as limited meanings. The present disclosure may be modified and changed in various ways. Accordingly, the present disclosure may be freely executed within the scope of the claims, unless otherwise described.

The invention claimed is:

1. A Micro-Secure Digital ("SD") device loaded with a smart card, comprising:
   a SD interface comprising a number of pads configured to be electrically connected to a host terminal in which the Micro-SD device is inserted, wherein said SD interface includes eight or more SD pads which are compatible with a Micro-SD standard and positioned at an end of a body of the Micro-SD device;
   at least one memory module;
   a SD controller connected to said SD interface to provide communication between the host terminal and said at least one memory module;
   at least one smart card integrated circuit ("IC") connected for data communication with said SD controller and comprising a security authority module; and
   a smart card interface comprising a number of pads configured to be electrically connected to the host terminal, wherein said at least one smart card IC is configured to be accessed directly through said pads of said smart card interface, and wherein said smart card interface includes six or more ISO 7816 standard pads which are positioned in the rear of said SD pads;
   wherein the Micro-SD device is configured to be detachable from an empty card having a size and a form that satisfy the International Organization for Standardization ("ISO") 7810 standard of a plastic card so that it is automatically issued by a universal card-issuing device.

2. The Micro-SD device loaded with a smart card according to claim 1, wherein the ISO 7816 standard pads include a power supply terminal, an initialization input terminal, a clock terminal, a grounding terminal, a program voltage terminal and a serial data input/output ("I/O") terminal.

3. The Micro-SD device loaded with a smart card according to claim 1, wherein said at least one smart card IC is configured to be accessed directly through the smart card interface and/or through the SD interface and the SD controller.

4. The Micro-SD device loaded with a smart card according to claim 1, wherein the body of the Micro-SD device includes a shoulder for removal from the host terminal.

5. The Micro-SD device loaded with a smart card according to claim 1, wherein the body of the Micro-SD device includes a groove for removal from the host terminal.

6. The Micro-SD device loaded with a smart card according to claim 1, wherein said smart card interface is connected to a communication line between the SD controller and the at least one smart card IC.

7. The Micro-SD device loaded with a smart card according to claim 1, wherein said smart card interface is connected directly to the at least one smart card IC.

* * * * *